United States Patent [19]

Hicok et al.

[11] Patent Number: 5,710,575

[45] Date of Patent: Jan. 20, 1998

[54] SYSTEM FOR DIGITALLY EMULATING THE ANALOG POSITION OF A PC GAME PORT JOYSTICK

[75] Inventors: Gary Hicok, Mesa; Kenneth Potts, Gilbert; Scott Harrow, Scottsdale, all of Ariz.

[73] Assignee: VLSI Technology, Inc., San Jose, Calif.

[21] Appl. No.: 653,255

[22] Filed: May 24, 1996

[51] Int. Cl.⁶ ........................................... G09G 5/08
[52] U.S. Cl. ................... 345/161; 345/156; 345/157
[58] Field of Search ........................... 345/156, 157, 345/159, 161, 163; 273/148 B; 74/471

[56] References Cited

U.S. PATENT DOCUMENTS 4,217,642  8/1980  Dam et al. ............................ 345/157
4,296,407 10/1981  Minakuchi ............................ 341/147
4,916,440  4/1990  Faeser et al. ........................ 345/156

*Primary Examiner*—Kee M. Tung
*Assistant Examiner*—Matthew Luu
*Attorney, Agent, or Firm*—LaValle D. Ptak

[57] ABSTRACT

A joystick system provides a digital representation of the setting of a joystick potentiometer. The voltage of the joystick is supplied to an analog-to-digital converter, the output of which then is used to load a counter. In one mode of operation, the counter counts down to zero at some multiple of the sample rate. When the counter reaches zero, the time interval representative of the joystick position is indicated; and this output is indicative of the joystick position. In an alternative mode of operation, the counter is used as a data latch and the joystick position is digitally read from the counter, which keeps the data latched until the next sample cycle from the joystick position.

9 Claims, 1 Drawing Sheet

SYSTEM FOR DIGITALLY EMULATING THE ANALOG POSITION OF A PC GAME PORT JOYSTICK

BACKGROUND

Many computer games have been developed using programs which interface with spatial manipulation of one or more "joysticks" in the form of analog potentiometers. The joystick swings through a range on the potentiometer which is used to set the time delay of a one-shot multi-vibrator whenever the player decides to select that setting of the potentiometer. When multiple potentiometers are used, the same approach is used to obtain the setting from each of the potentiometers. Typically, four orthogonally arranged potentiometers are employed in a joystick configuration to obtain four related settings, each of which sets a separate one-shot multi-vibrator to establish a different time delay, depending upon the different positions of the potentiometers at the time the player of the program requests a readout of the setting.

Since prior art joystick game inputs utilize the R/C analog time delay of a one-shot multi-vibrator, accuracy of the potentiometer output readout may be imprecise or inconsistent. The readings vary particularly with changes in temperature and with inherent variations in components during manufacturing. In addition, a relatively large component count for each of the one-shot multi-vibrators is required for such a system. The component count and the manufacturing costs for both the components and the assembly into the completed system cause such systems to be relatively expensive.

It is desirable to provide a system for providing the input from an analog joystick potentiometer which consistently produces a more accurate indication of the joystick position, and which still remains compatible with the R/C multi-vibrator timer approach.

SUMMARY OF THE INVENTION

It is an object of this invention to provide an improved system for obtaining a signal representative of a potentiometer position.

It is another object of this invention to provide an improved digital system for providing an output indicative of the setting of a potentiometer.

It is an additional object of this invention to provide an improved digital system for indicating the position of a joystick potentiometer.

It is a further object of this invention to provide an improved digital system for providing an output indicative of the position of a joystick potentiometer which is compatible with conventional analog systems, and which also may be operated with digital systems.

In accordance with a preferred embodiment of the invention, a system provides a digital representation of the setting of a potentiometer. This is accomplished by employing an analog-to-digital converter with an input coupled with the source of analog signals from a potentiometer. A digital counter is coupled to the output of the analog-to-digital converter to be set with a count from the converter which corresponds to the position of the potentiometer setting, A clock circuit is coupled with the counter to cause the counter to count down to an initial count, whereupon an output signal is produced corresponding to the count in the counter. Since the count in the counter corresponds to the setting of the potentiometer, the time required for the countdown corresponds to the potentiometer setting in a manner compatible with an R/C multi-vibrator timer. If the time interval countdown is not required, the output counter is operated as a data latch directly to provide a digital representation of the potentiometer setting.

DETAILED DESCRIPTION

Figure 1:
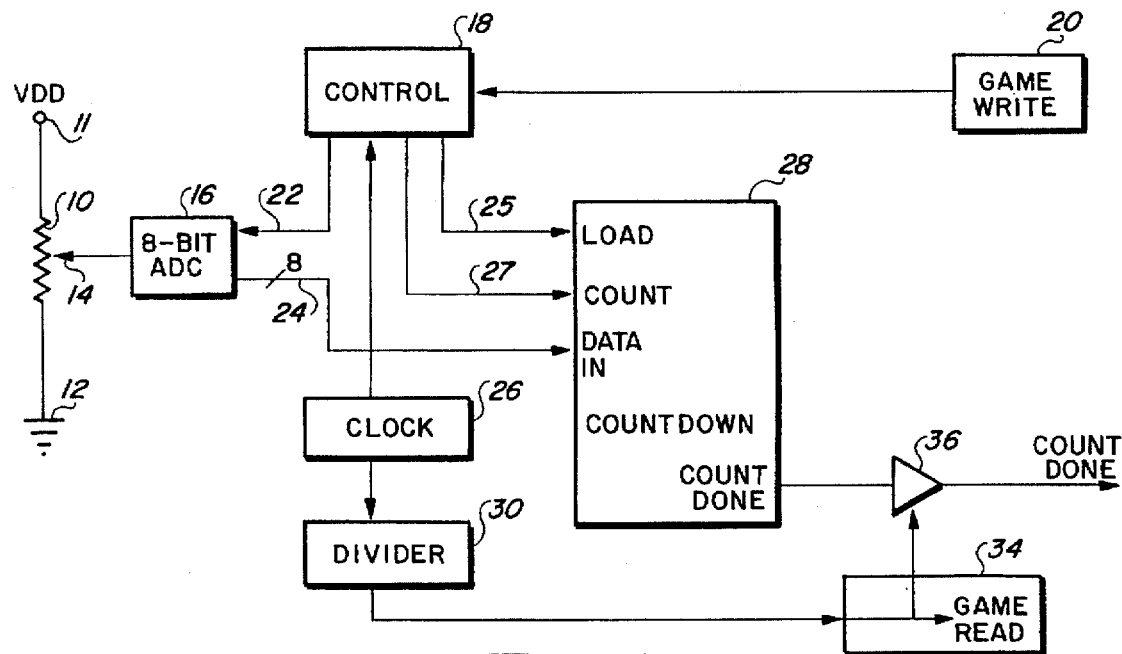
FIG. 1 is a block diagram of a preferred embodiment of the invention.

Reference now should be made to the drawing, in which the same reference numbers are used in both figures to designate the same components. FIG. 1 is a block diagram of a preferred embodiment of the invention for converting the analog information of a joystick potentiometer to a digitized form. As illustrated in FIG. 1, the joystick potentiometer 10 is connected between a source of supply voltage 11 VDD and ground 12. The slider or output 14 of the potentiometer 10 (the joystick axis) is positioned by the joystick lever (not shown) in a conventional manner. As is well known, the position of the slider 14 on the potentiometer causes a voltage to be supplied which is representative of the position between the maximum voltage at 11 and the ground potential at 12. Because the use of analog joystick potentiometers for computer games is well known, the various controls and interconnections between such joysticks and other portions of a computer game are not shown, since these various controls and circuits are standard. The additions which are provided by the preferred embodiment of the invention, however, are shown in detail in FIG. 1.

The output of the potentiometer at 14 is an analog voltage, as described above. This output is supplied to the input of an eight-bit analog-to-digital converter (ADC) 16. The ADC 16 continuously provides an eight-bit digital representation of the analog voltage supplied to it from the output 14 of the joystick potentiometer 10. For computer games, when the position of the joystick is to be utilized or supplied to the game to supply some function, a game write pulse 20 is produced. This pulse is shown in FIG. 1 as being supplied to a control circuit 18, the operation of which is controlled by a clock 26, typically formed as a part of the computer system; so that the game write input 20 is synchronized or coordinated with pulses from the clock source 26.

Whenever a game write pulse 20 is provided to the control circuit 18, coincidence with a clock pulse from the clock 26 causes a transfer signal to be applied over a lead 22 to the analog-to-digital converter 16. When this occurs, the eight-bit parallel output from the ADC 16 is supplied over a bus 24 to the data inputs of a countdown counter 28. This occurs simultaneously with a load pulse from the control circuit 18 applied over a lead 25, followed by successive countdown clock pulses applied over a lead 27 from the control circuit 18. The pulses applied over the lead 27 are synchronized by the clock circuit 26 operating through the control circuit 18.

In summary, whenever a game write pulse or signal 20 is obtained, the current status of the joystick position at the slider 14 on the potentiometer 10 is transformed into digital form by the analog-to-digital converter 16 and is loaded into the countdown counter 28. The countdown immediately takes place toward a counter "zero" or initial value.

At the same time, pulses from the clock circuit 26 are supplied through a divider 30 to produce game read signals or sample signals at a "game read" terminal or circuit 34. As a result of the divider 30, it is apparent that the counter 28 counts down to zero or its initial value at some multiple of the sample rate obtained from the divider 30.

When the counter 28 reaches its final or zero count, a signal is applied to the input of a gated amplifier 36, which is enabled to produce a "countdown" output upon the occurrence of the next game read signal from the circuit 34. The output from the gated amplifier 36 signals that the timed interval is over. The host system keeps track of the time from the initial sample taken at the time of initiation of the game write pulse 20 to the bit assertion from the output of the gated amplifier 36, thereby resolving the joystick position in terms of a time interval comparable to the time interval obtained from the prior art R/C based multi-vibrator circuits. The time delay between the game write pulse 20 to the countdown output from the gated amplifier 36 is comparable to that of prior art analog systems. The system of FIG. 1 provides an accurate and consistent digitized time interval through the use of the countdown counter 28.

Figure 2:
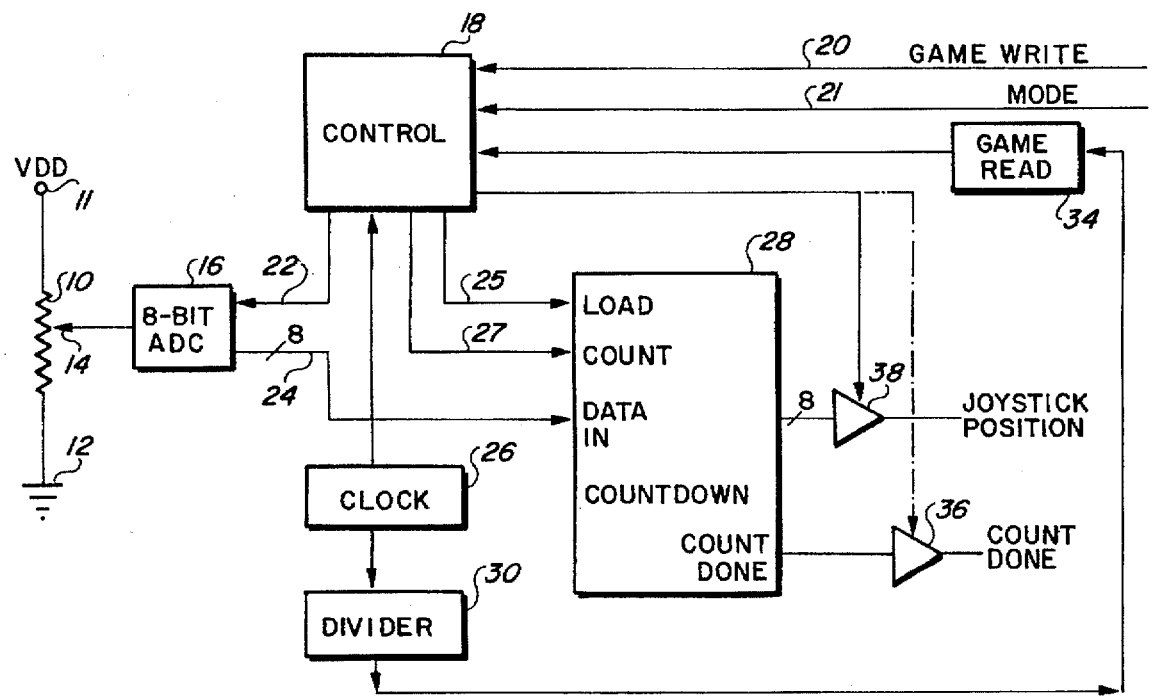
FIG. 2 is a block diagram of an alternative embodiment of the invention.

Reference now should be made to FIG. 2, which illustrates a variation of the circuit of FIG. 1. In the circuit of FIG. 2, the elements which are common to the circuit of FIG. 1 are provided with the same reference numbers; and operation of the circuit for these elements is the same as shown in FIG. 1. In FIG. 2, however, the circuit is capable of providing the "countdown" time delay output from the gated amplifier 36, as well as a parallel eight-bit digital output which may be utilized in systems capable of operation directly from the digital information obtained from the analog-to-digital converter 16.

The circuit of FIG. 2 includes an additional control signal applied over a lead 21 to the control circuit 18. This is a "mode" signal used to cause the control circuit 18 to operate either in a countdown mode applying clock pulses over the lead 27, as described previously, or simply to load the counter 28, in the manner described previously, without the countdown. If the time interval measurement of the circuit shown in FIG. 1 is the mode which is selected, the operation is identical to the operation described above in conjunction with FIG. 1. The game read signal, however, is shown as being applied through the control circuit 18, and from there to the gate of the gated amplifier 36 for this mode of operation.

When the circuit of FIG. 2, however, is operated in its fully digital mode, as determined by a signal on the lead 21, no count pulses or clock pulses are applied over the lead 27 from the control circuit 18 after the eight-bit digital information is loaded in the counter 28 by a pulse over the lead 25. The counter 28 operates as a latch circuit in this mode and retains the stored digital information until the next sample of the ADC 16 is made. In this mode of operation, when the game read signal from the circuit 34 is applied through the control circuit 18, the pulse obtained on the output of the control circuit 18 is applied to a gated buffer amplifier circuit 38, which has an eight-bit parallel input applied through it to produce an eight-bit parallel output representative of the digital joystick position for utilization in the game computer as a direct digital input. In all other respects, the circuit of FIG. 2 operates in the same manner as the circuit of FIG. 1.

The foregoing description of the preferred embodiments of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A system for providing a digital representation of the setting of a potentiometer including in combination:

an analog-to-digital converter having an input coupled with a source of analog signals from a potentiometer and having digital output;

a digital counter coupled to the output of said analog-to-digital converter to receive signals therefrom and having an output;

a sample device coupled with the output of said digital counter;

a control circuit coupled with said digital counter to load said counter with the output from said analog-to-digital converter at a predetermined time;

a clock circuit producing clock signals coupled with said counter to cause said counter to count down to an initial value to produce an output signal on the output thereof when said count down to said initial value is attained; and a circuit coupled with said clock circuit for causing said sample device periodically to sample said output from said digital counter at a predetermined rate.

2. The combination according to claim 1 wherein said initial value of said counter is a count of zero.

3. The combination according to claim 2 wherein said predetermined rate is at a lower frequency than the frequency of said clock signals.

4. A universal system for providing representations of the setting of an analog joystick potentiometer including in combination:

an analog-to-digital converter having an input coupled with a source of analog signals from said joystick potentiometer and having a digital output;

a digital counter coupled to the output of said analog-to-digital converter to receive signals therefrom and providing parallel digital outputs representative of the count therein and further having another output representative of an initial count therein;

a control circuit coupled with said digital counter to load said counter with the output from said analog-to-digital converter at a predetermined time;

a joystick position gate circuit coupled with the digital outputs of said counter for supplying said outputs when said joystick gate circuit is enabled;

a countdown circuit coupled with the countdown output of said counter for producing an output signal whenever said countdown circuit is enabled and a signal representative of said initial count appears on said another output of said counter;

a source of mode control signals coupled with said control circuit for causing said control circuit to operate said counter in a countdown mode in a first mode of operation and to operate as a data latch in a second mode of operation; and a clock circuit coupled with said control circuit for supplying clock pulses thereto, with said clock pulses being supplied to said counter by said control circuit in said first mode of operation to cause said counter to count down to an initial value to produce an output signal on said another output thereof when said countdown to said initial value is attained, with said control circuit operated in said first mode of operation, said control circuit in said second mode of operation enabling said joystick gate circuit at a second predetermined time.

5. The combination according to claim 4 wherein said initial count is zero.

6. The combination according to claim 5 further including a sample device coupled with the output of said digital counter; and a circuit coupled with said clock circuit for causing said sample device periodically to sample said output from said digital counter at a predetermined rate.

7. The combination according to claim 6 wherein said predetermined rate is at a lower frequency than the frequency of said clock signals.

8. The combination according to claim 4 further including a sample device coupled with the output of said digital counter; and a circuit coupled with said clock circuit for causing said sample device periodically to sample said output from said digital counter at a predetermined rate.

9. The combination according to claim 8 wherein said predetermined rate is at a lower frequency than the frequency of said clock signals.

* * * * *